No. 11,755. Reissued July 4, 1899.

W. MUIR.

EJECTOR FOR MINING AND DREDGING.

(Application filed May 22, 1899.)

WITNESSES

J. A. Bayless

Chas. J. Armbruster

INVENTOR

William Muir by Jno. L. Boone his attorney

UNITED STATES PATENT OFFICE.

WILLIAM MUIR, OF MICHIGAN BLUFF, CALIFORNIA, ASSIGNOR TO THE HYDRAULIC EJECTOR DREDGING COMPANY, OF CALIFORNIA.

EJECTOR FOR MINING AND DREDGING.

SPECIFICATION forming part of Reissued Letters Patent No. 11,755, dated July 4, 1899.

Original No. 573,611, dated December 22, 1896. Application for reissue filed May 22, 1899. Serial No. 717,875.

*To all whom it may concern:*

Be it known that I, WILLIAM MUIR, a citizen of the United States, residing at Michigan Bluff, county of Placer, State of California, have invented an Improvement in Ejectors for Mining Purposes and Dredging; and I hereby declare the following to be a full, clear, and exact description of the same.

My invention relates to a device which is especially adapted to raise water or sand, mud, and gravel from mines or depressed locations and for dredging bay and river bottoms, &c., and eject it at a considerable distance above the point from which it is raised into lighters or otherwise.

It consists in certain details of construction, which will be more fully explained by reference to the accompanying drawings, in which—

Figure 1:
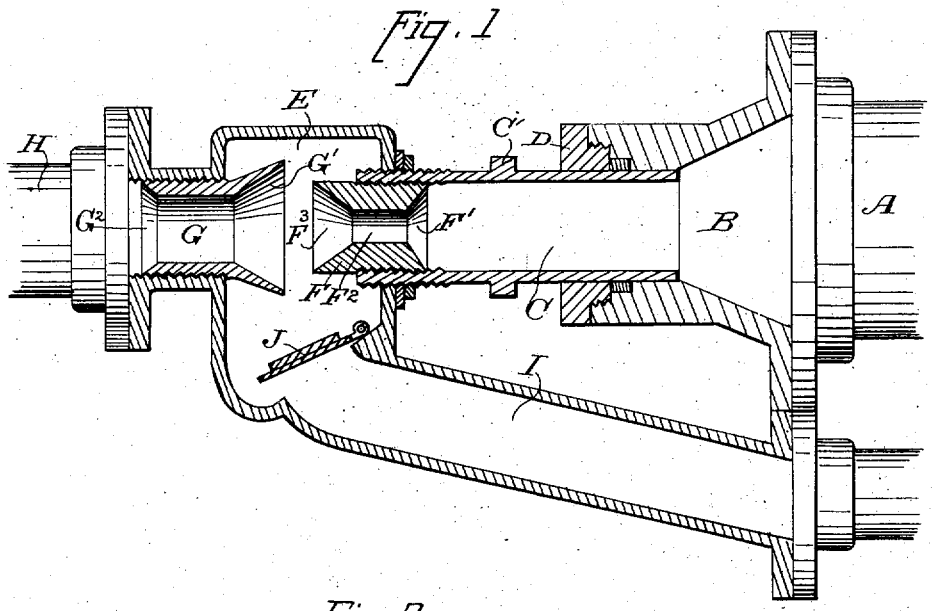
Figure 2:
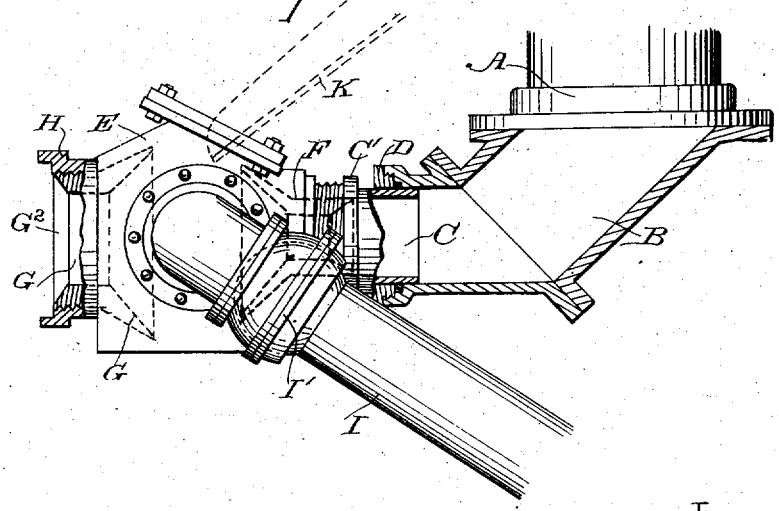

Figure 1 is a sectional elevation of the apparatus as designed for raising water alone. Fig. 2 is an elevation of my apparatus, showing the movable suction-pipe and joint for dredging purposes.

A is a pipe through which water is brought to the apparatus under a considerable pressure or head.

B is a converging chamber to which the pipe A is bolted and into which the water therefrom is delivered.

C is a cylindrical pipe having a diameter approximately equal to the diameter of the smaller end of the chamber B, which delivers into the pipe C. This pipe C is movable in the cylindrical extension of the chamber B, within which it fits, and a tight joint is made by means of a gland D and suitable packing, forming what is known as a "stuffing-box."

E is a suction-chamber situated in line with the pipe C and having a screw-threaded opening into which the correspondingly screw-threaded end of the pipe C is fitted to turn, with suitable collars to form a joint and prevent leakage.

The central portion of the pipe C has an exterior polygonal flange C′, by which the pipe C may be turned, so that by reason of its screw-threaded end it can be advanced into the chamber E or retracted therefrom, the opposite end turning and moving smoothly through the stuffing-box D.

The interior of the screw-threaded end of the pipe C is also screw-threaded, and within it fits a screw-threaded sleeve F, which may be advanced or retracted and adjusted within the end of the pipe C. This sleeve F has the end which faces the pipe C made conical and converging, as shown at F′, so as to contract the opening, and the water which passes through this is delivered into a cylindrical central portion $F^2$, of a diameter corresponding with that of the inner end of the cone F′. From the opposite end of $F^2$ the passage is again enlarged in the form of a conical diverging chamber $F^3$, and through this end the water is discharged into the chamber E from the nozzle $F^2$.

The end of the chamber E which is in line with and opposite to the sleeve F has a screw-threaded opening made in it, and within this opening is fitted a screw-threaded sleeve G, the central portion of which has a cylindrical passage, as shown, of larger diameter than that of the nozzle $F^2$. The end which is presented within the chamber E is made diverging or funnel-shaped, as shown at G′, and the opposite end is again made diverging, as shown at $G^2$, and discharges into the delivery-pipe H, which is bolted to the side of the chamber E and is axially in line with the sleeves G F, pipe C, and inlet.

To the lower part of the chamber E is connected the suction-pipe I, which leads downward to the point from which water is to be raised. The inner end of the pipe I opens directly into the chamber E and is provided with a valve J, which opens inwardly into the chamber E and closes to prevent the return of water through the pipe I.

In the operation of the device water being admitted under a high pressure through the pipe A is delivered through the funnel-shaped passage B into the cylindrical pipe C, thence into the double-funnel-shaped sleeve F, and being discharged from the nozzle thereof across the space between $F^3$ and G′ it forms a vacuum, which acts to draw the water up through the pipe I and valve J and cause it to mingle with that which is being discharged from F to G, the whole being carried by the momentum of the body of water into the pipe H and raised to a height which depends on the pressure of the supply-column.

An important feature of this invention is the pipe C and the screw-threaded sleeves F and G. By this means the section G is first set at the proper point within the chamber E. The section F is screwed into the pipe C, and the latter is then adjusted by turning it so that by reason of the screw-threaded end which fits into the chamber E it may be advanced toward or retracted from the sleeve G until the space between is such as to produce the highest efficiency and best result. As this may vary with the head or pressure of water or the height to which the water is to be drawn or raised, it will be manifest that this construction enables me to adjust the apparatus at all times so as to produce the highest efficiency.

The body of water delivered through the part $F^2$ of the sleeve F is discharged as from a nozzle with great velocity and axially into the sleeve G, and the funnel shape of the ends $F^3$ and G′, respectively, of these sleeves acts to materially assist in the suction and the commingling of the water which is drawn into chamber E with that which is being forced through the chamber, so as to carry the whole body onward and upward and deliver it.

Either or both of the sleeves or nozzles F and G may be independently adjusted or removed by removing the cap of the suction-chamber without disturbing any other part.

In Fig. 2 I have shown the chamber E as closed at the bottom and having an opening at the side into which the sluice K is adapted to discharge sand or gravel in such quantities as the velocity and amount of water will carry, and it is taken up and immediately propelled through the discharge-passage and delivered with the water.

As shown in Fig. 2, the sluice K may be removed and a suction-pipe connected with the passage leading to the point from which the water or material is to be drawn. This pipe is constructed with a swivel or ball joint I′, so that it may be turned about the joint. The material is drawn in by suction. If the point of supply is gradually lowered, the joint in the pipe allows the end of the pipe to be depressed correspondingly, and if the supply-point is lowered beyond the length of the pipe another section may be inserted, the swivel-joint adjusting it to the surface from which it is supplied. When the apparatus is used for dredging purposes, the lower end of this movable suction-pipe can be passed around over a considerable area of bottom without changing the position of the receiving and discharging portions of the apparatus. In this latter use of the machine the distance between the water-supply and the discharge openings in the suction-chamber should be at least equal to the diameter of the suction or delivery pipe and the flare of the discharge-pipe should be greatly increased, as shown by the dotted lines in Fig. 2.

Having thus described my invention, what I claim as new, and desire to secure by Letters Patent, is—

1. A supply-pipe, a receiving-chamber with which it is connected, a suction-chamber separated from and in line therewith, a cylindrical sleeve having screw-threads fitting a corresponding screw-threaded opening in the suction-chamber at one end, and a smooth cylindrical portion slidable through a stuffing-box into the receiving-chamber, a means for rotating the sleeve so as to advance or retract it with relation to the suction-chamber, a sleeve adjustable in the discharge end of the cylinder having a central cylindrical passage and conical ends, and a corresponding sleeve fitting the opposite side of the suction-chamber axially in line with the first-named sleeve and with the discharge-pipe, and a suction-pipe connecting with the suction-chamber.

2. A supply-pipe and contracted receiving-head, a cylindrical pipe fitting and slidable in said head and a stuffing-box to make a tight joint therewith, a suction-chamber, having a screw-threaded opening into which the opposite end of the pipe fits with corresponding screw-threads, a means for turning the pipe whereby it may be advanced or retracted within the suction-chamber, a screw-threaded sleeve fitting the interior of the pipe and adjustable with relation thereto independent of the adjustment of the pipe in the suction-chamber, said sleeve having a cylindrical central opening with diverging conical receiving and discharge ends respectively, a second sleeve with cylindrical central portion and conical receiving end opening into the suction-chamber at a distance from the first-named sleeve and screw-threads by which it is adjustable so as to regulate its position with relation to the interior of the suction-chamber and to the first-named sleeve, and a supply pipe or passage by which water or gravel is delivered into the suction-chamber.

3. In an apparatus for the propulsion of water and material by a column of water under pressure, a supply and a discharge pipe, and an intermediate suction-chamber with passages axially in line, a cylindrical pipe opening into the suction-chamber at one end and slidably mounted at its opposite end, and a nozzle fitted to said pipe and projecting into the said chamber.

4. In an apparatus for the propulsion of water or material by a column of water under pressure, a supply and a discharge pipe, and intermediate suction-chamber with passages in line, a pipe extending from the supply-pipe and adjustably fitted to one end of the suction-chamber, and provided with a sleeve or nozzle, and a second sleeve opening into the opposite end of the suction-chamber at a distance from the first-named sleeve, and having its opposite end opening into the discharge.

5. In an apparatus for the propulsion of water and material by a column of water under pressure, a supply and a discharge pipe, and an intermediate suction-chamber with passages axially in line, a cylindrical pipe opening into the suction-chamber at one end and slidably mounted at its opposite end, a nozzle fitted to said pipe and projecting into said chamber, and independently adjustable, and a funnel-shaped sleeve fitted into the opposite side of the chamber and longitudinally adjustable with relation to the discharge-pipe.

6. In an apparatus for the propulsion of water or material by a column of water under pressure, a supply and a discharge pipe and intermediate suction-chamber with passages in line, a pipe leading from the supply-passage and entering one end of the suction-chamber, a nozzle carried by the end of the pipe within the suction-chamber having funnel-shaped ends and intermediate cylindrical portion, a sleeve entering the opposite end of the suction-chamber and separated a distance from the nozzle, and means whereby water or gravel is delivered into the suction-chamber.

7. In an apparatus for raising water and material and propelling the same through a discharge-pipe by a column of water under pressure, a supply and a discharge pipe and an intermediate suction-chamber with passages axially in line, and a movable suction-pipe connected with said chamber.

8. In an apparatus for raising water and material and propelling the same through a discharge-pipe by a column of water under pressure, a supply and a discharge pipe and an intermediate suction-chamber with passages axially in line, a short stationary section of a suction-pipe connected with said chamber, and a section of suction-pipe movably connected with the outer end of said short section.

9. In an apparatus for raising water and other material and propelling the same through a discharge-pipe by a column of water under pressure, a supply and discharge pipe and intermediate chamber with passages axially in line, a short curved section of a suction-pipe connected with said chamber, and a movable section or continuation of said pipe connected with the outer end of the short section by a ball or swivel joint.

In witness whereof I have hereunto set my hand.

WILLIAM MUIR.

Witnesses:
JOHN W. ELLIS,
D. B. RICHARDS.